United States Patent
Honey

(10) Patent No.: US 10,021,823 B2
(45) Date of Patent: *Jul. 17, 2018

(54) HARVESTING HEADER TRANSPORT APPARATUS AND METHOD

(71) Applicant: Honey Bee Manufacturing Ltd., Frontier (CA)

(72) Inventor: Glenn Honey, Frontier (CA)

(73) Assignee: HONEY BEE MANUFACTURING INC., Frontier, SK (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/143,023

(22) Filed: Dec. 30, 2013

(65) Prior Publication Data

US 2015/0181809 A1    Jul. 2, 2015

(51) Int. Cl.
| | | |
|---|---|---|
| *A01B 73/00* | (2006.01) | |
| *A01D 75/00* | (2006.01) | |
| *B60P 3/06* | (2006.01) | |

(52) U.S. Cl.
CPC .......... *A01B 73/005* (2013.01); *A01D 75/002* (2013.01); *B60P 3/066* (2013.01)

(58) Field of Classification Search
CPC ...... A01B 73/00; A01B 73/005; A01D 75/00; A01D 75/002; A01D 75/004
USPC ....................................................... 280/404
See application file for complete search history.

(56) References Cited

U.S. PATENT DOCUMENTS

| | | | |
|---|---|---|---|
| 12,750 A | 4/1855 | Chatfield | |
| 524,215 A | 8/1894 | Quigley | |
| 2,271,808 A * | 2/1942 | Starkey ..................... | B60P 3/41 |
| | | | 280/404 |
| 2,413,072 A | 12/1946 | Sage | |
| 2,694,894 A | 11/1954 | Linscheld | |
| 3,468,109 A | 9/1969 | Reimer | |
| 3,472,008 A | 10/1969 | Hurlburt | |
| 3,550,366 A | 12/1970 | Gibson | |
| 3,702,661 A * | 11/1972 | Berry, Jr. .............. | B60P 3/2225 |
| | | | 280/404 |
| 3,771,299 A | 11/1973 | Gradwohl et al. | |
| 3,927,512 A | 12/1975 | Molzahn | |
| 3,945,180 A | 3/1976 | Sinclair | |

(Continued)

FOREIGN PATENT DOCUMENTS

| | | |
|---|---|---|
| CA | 1003310 | 1/1977 |
| CA | 1040438 | 10/1978 |

(Continued)

*Primary Examiner* — Anne Marie M Boehler
*Assistant Examiner* — Felicia L. Brittman

(57) ABSTRACT

A transport system for transport of a harvesting header comprises separate front and rear carriers in a configuration that permits a single person to prepare a harvesting header for transport. The wheeled front carrier engages a support member attached to one end of the harvesting header and includes a towing member and means of connecting the front carrier to a towing vehicle. A wheeled rear carrier comprises deployable straps that can be attached to the harvesting header. A winch applies tension to the straps and on retraction pulls the rear carrier up and into position underneath the header. The harvesting header is then lowered to transfer the weight to the carriers and the header then disconnected from the combine, and is ready for transport.

35 Claims, 9 Drawing Sheets

(56) References Cited

U.S. PATENT DOCUMENTS

| | | |
|---|---|---|
| 4,038,810 A | 8/1977 | Williams et al. |
| 4,067,177 A | 1/1978 | Tout |
| 4,120,137 A | 10/1978 | Schoenberger et al. |
| 4,127,981 A | 12/1978 | Parrish et al. |
| 4,137,696 A | 2/1979 | Webb |
| 4,156,340 A | 5/1979 | Colgan et al. |
| 4,174,602 A | 11/1979 | Webb et al. |
| 4,177,625 A | 12/1979 | Knight et al. |
| 4,187,664 A | 2/1980 | Meek et al. |
| 4,202,154 A | 5/1980 | Waldrop et al. |
| 4,270,338 A | 6/1981 | Halls |
| 4,346,909 A | 8/1982 | Hundeby |
| 4,353,201 A | 10/1982 | Pierce et al. |
| 4,385,483 A | 5/1983 | McIlwain |
| 4,435,948 A | 3/1984 | Jennings |
| 4,512,140 A | 4/1985 | Blakeslee |
| 4,519,190 A | 5/1985 | Blakeslee |
| 4,522,018 A | 6/1985 | Blakeslee |
| 4,541,229 A | 9/1985 | Elijah |
| 4,573,124 A | 2/1986 | Seiferling |
| 4,573,309 A | 3/1986 | Patterson |
| 4,612,757 A | 9/1986 | Halls et al. |
| 4,637,201 A | 1/1987 | Pruitt et al. |
| 4,641,490 A | 2/1987 | Wynn et al. |
| 4,660,361 A | 4/1987 | Remillard et al. |
| 4,662,161 A | 5/1987 | Patterson |
| 4,751,809 A | 6/1988 | Fox et al. |
| 4,776,155 A | 10/1988 | Fox et al. |
| 4,833,869 A | 5/1989 | Klein |
| 4,909,026 A | 3/1990 | Molzahn et al. |
| 4,936,082 A | 6/1990 | Majkrzak |
| 4,944,141 A | 7/1990 | Orlando et al. |
| 4,956,966 A | 9/1990 | Patterson |
| 4,988,115 A * | 1/1991 | Steinke ............... B62D 63/068 280/404 |
| 5,005,343 A | 4/1991 | Patterson |
| 5,007,235 A | 4/1991 | Nickel et al. |
| 5,086,613 A | 2/1992 | Fox et al. |
| 5,155,983 A | 10/1992 | Sheehan et al. |
| 5,157,905 A | 10/1992 | Talbot et al. |
| 5,243,810 A | 9/1993 | Fox et al. |
| 5,261,290 A | 11/1993 | Ramsay et al. |
| 5,333,904 A | 8/1994 | Kuhns |
| 5,359,839 A | 11/1994 | Parsons et al. |
| 5,435,239 A | 7/1995 | Talbot |
| 5,459,986 A | 10/1995 | Talbot et al. |
| 5,473,872 A | 12/1995 | Fox et al. |
| 5,535,577 A | 7/1996 | Chmielewski et al. |
| 5,595,053 A | 1/1997 | Jasper et al. |
| RE35,543 E | 7/1997 | Patterson |
| 5,678,398 A | 10/1997 | Fox et al. |
| 5,681,117 A | 10/1997 | Wellman et al. |
| 5,704,200 A | 1/1998 | Chmielewski, Jr. et al. |
| 5,768,870 A | 6/1998 | Talbot et al. |
| 5,791,128 A | 8/1998 | Rogalsky |
| 5,927,606 A | 7/1999 | Patterson |
| 5,970,695 A | 10/1999 | Dunn |
| 5,992,759 A | 11/1999 | Patterson |
| 6,029,429 A | 2/2000 | Fox et al. |
| 6,044,636 A | 4/2000 | Minnaert |
| 6,047,989 A * | 4/2000 | Wood ............................ 280/789 |
| 6,079,194 A | 6/2000 | Waldrop |
| 6,170,244 B1 | 1/2001 | Coers et al. |
| 6,195,972 B1 | 3/2001 | Talbot et al. |
| 6,199,358 B1 | 3/2001 | Majkrzak |
| 6,209,297 B1 | 4/2001 | Yeomans et al. |
| 6,282,876 B1 | 9/2001 | Patterson |
| 6,324,823 B1 | 12/2001 | Remillard |
| 6,351,931 B1 | 3/2002 | Shearer |
| 6,397,573 B2 | 6/2002 | Majkrzak |
| 6,428,047 B1 | 8/2002 | Kaderabek |
| 6,442,918 B1 | 9/2002 | Fox |
| 6,453,655 B2 | 9/2002 | Ferraris |
| 6,502,379 B1 | 1/2003 | Snider |
| 6,519,923 B1 | 2/2003 | Cooksey et al. |
| 6,530,202 B1 | 3/2003 | Guyer |
| 6,543,211 B1 | 4/2003 | Talbot |
| 6,591,598 B2 | 7/2003 | Remillard et al. |
| 6,675,568 B2 | 1/2004 | Patterson et al. |
| 6,698,175 B1 | 3/2004 | Schumacher et al. |
| 6,708,475 B2 | 3/2004 | Guyer |
| 6,817,166 B2 | 11/2004 | Dunn |
| 6,843,045 B2 | 1/2005 | Bickel |
| 6,854,251 B2 | 2/2005 | Snider |
| 6,865,871 B2 | 3/2005 | Patterson et al. |
| 6,889,492 B1 | 5/2005 | Polk et al. |
| 6,962,040 B2 | 11/2005 | Talbot |
| 7,077,220 B2 | 7/2006 | Dunn et al. |
| 7,131,253 B2 | 11/2006 | Remillard et al. |
| 7,159,687 B2 | 1/2007 | Dunn et al. |
| 7,188,461 B2 | 3/2007 | Fox et al. |
| 7,197,865 B1 | 4/2007 | Enns et al. |
| 7,306,062 B2 | 12/2007 | Dunn |
| 7,306,252 B2 | 12/2007 | Barnett |
| 7,308,947 B2 | 12/2007 | Barnett |
| 7,322,175 B2 | 1/2008 | Ferre et al. |
| 7,328,565 B2 | 2/2008 | Snider et al. |
| 7,340,876 B1 | 3/2008 | Barnett |
| 7,347,277 B2 | 3/2008 | Enns et al. |
| 7,356,982 B2 | 4/2008 | Barnett |
| 7,364,181 B2 | 4/2008 | Patterson |
| 7,373,769 B2 | 5/2008 | Talbot et al. |
| 7,392,124 B2 | 6/2008 | MacGregor et al. |
| 7,392,646 B2 | 7/2008 | Patterson |
| 7,438,305 B2 | 10/2008 | Schulz |
| 7,444,798 B2 | 11/2008 | Patterson et al. |
| 7,454,888 B2 | 11/2008 | Barnett |
| 7,461,498 B1 | 12/2008 | Barnett |
| 7,467,505 B2 | 12/2008 | MacGregor |
| 7,472,533 B2 | 1/2009 | Talbot et al. |
| 7,484,349 B2 | 2/2009 | Talbot et al. |
| 7,497,069 B2 | 3/2009 | Enns et al. |
| 7,647,755 B2 | 1/2010 | Barnett et al. |
| 7,721,830 B2 | 5/2010 | Dunn et al. |
| 7,730,707 B2 | 6/2010 | Pietricola et al. |
| 7,849,952 B2 | 12/2010 | MacGregor et al. |
| 7,856,801 B2 | 12/2010 | Remillard |
| 7,918,076 B2 | 4/2011 | Talbot |
| 7,958,706 B2 | 6/2011 | Remillard et al. |
| 8,006,469 B2 | 8/2011 | Barnett |
| 8,015,784 B2 | 9/2011 | Barnett et al. |
| 8,020,363 B1 | 9/2011 | Barnett et al. |
| 8,020,648 B2 | 9/2011 | Otto |
| 8,056,311 B1 | 11/2011 | Barnett |
| 8,069,640 B2 | 12/2011 | Barnett et al. |
| 8,096,102 B2 | 1/2012 | Smith |
| 8,117,812 B2 | 2/2012 | Patterson |
| 8,161,719 B2 | 4/2012 | Barnett et al. |
| 8,176,716 B2 | 5/2012 | Coers et al. |
| 8,225,589 B2 | 7/2012 | Barnett |
| 8,225,903 B2 | 7/2012 | Dunn |
| 8,240,114 B2 | 8/2012 | Barnett |
| 8,245,489 B2 | 8/2012 | Talbot |
| 8,286,411 B2 | 10/2012 | Barnett et al. |
| 8,286,412 B2 | 10/2012 | Kidd et al. |
| 8,291,684 B2 | 10/2012 | Remillard et al. |
| 8,291,686 B1 | 10/2012 | Cormier et al. |
| 8,307,620 B1 | 11/2012 | Barnett et al. |
| 8,333,057 B2 | 12/2012 | Schroeder et al. |
| 8,341,927 B2 | 1/2013 | Barnett |
| 8,387,351 B2 | 3/2013 | Guyer |
| 8,402,728 B2 | 3/2013 | Kidd |
| 8,408,567 B2 | 4/2013 | Bergman et al. |
| 8,434,290 B2 | 5/2013 | Barnett et al. |
| 8,468,789 B2 | 6/2013 | Barnett et al. |
| 8,484,938 B2 | 7/2013 | Cormier et al. |
| 8,484,939 B1 | 7/2013 | Cormier et al. |
| 8,511,050 B1 | 8/2013 | Cormier et al. |
| 8,590,284 B2 | 11/2013 | Rayfield |
| 2003/0031524 A1* | 2/2003 | Brunet ........................ 410/100 |
| 2008/0086999 A1 | 4/2008 | Tippery et al. |
| 2009/0056296 A1* | 3/2009 | Patterson ............ A01D 75/002 56/228 |
| 2009/0189382 A1 | 7/2009 | Nubel et al. |

(56) References Cited

U.S. PATENT DOCUMENTS

| | | | |
|---|---|---|---|
| 2010/0052289 A1 | 3/2010 | Frey et al. | |
| 2011/0176882 A1* | 7/2011 | Bergen et al. | 410/44 |
| 2012/0251653 A1 | 10/2012 | Mathy, Jr. et al. | |
| 2012/0260870 A1 | 10/2012 | Wahl et al. | |
| 2013/0036860 A1 | 2/2013 | Corniani | |
| 2014/0001726 A1 | 1/2014 | Statz | |
| 2014/0033940 A1 | 2/2014 | Simpson et al. | |
| 2014/0150601 A1 | 6/2014 | McGrath | |

FOREIGN PATENT DOCUMENTS

| | | |
|---|---|---|
| CA | 1043577 | 12/1978 |
| CA | 2180627 | 1/1980 |
| CA | 1086508 | 9/1980 |
| CA | 1087402 | 10/1980 |
| CA | 1185438 | 4/1985 |
| CA | 1197694 | 12/1985 |
| CA | 1318135 | 5/1993 |
| CA | 2100204 | 1/1995 |
| CA | 2126909 | 1/1995 |
| CA | 2138939 | 6/1996 |
| CA | 2165735 | 6/1997 |
| CA | 2180625 | 1/1998 |
| CA | 2180626 | 1/1998 |
| CA | 2211363 | 1/1998 |
| CA | 2198672 | 8/1998 |
| CA | 2226200 | 11/1998 |
| CA | 2229152 | 8/1999 |
| CA | 2245213 | 2/2000 |
| CA | 2280681 | 2/2000 |
| CA | 2184278 | 8/2000 |
| CA | 2289164 | 10/2000 |
| CA | 2289171 | 10/2000 |
| CA | 2284432 | 4/2001 |
| CA | 2284436 | 4/2001 |
| CA | 2320379 | 5/2001 |
| CA | 2307176 | 10/2001 |
| CA | 2311019 | 12/2001 |
| CA | 2320524 | 3/2002 |
| CA | 2357825 | 9/2002 |
| CA | 2380557 | 10/2002 |
| CA | 2387898 | 12/2002 |
| CA | 2358883 | 4/2003 |
| CA | 2359598 | 4/2003 |
| CA | 2370891 | 4/2003 |
| CA | 2399234 | 6/2003 |
| CA | 2389513 | 12/2003 |
| CA | 2406416 | 4/2004 |
| CA | 2406419 | 4/2004 |
| CA | 2427755 | 11/2004 |
| CA | 2461790 | 11/2004 |
| CA | 2467595 | 12/2004 |
| CA | 2434981 | 1/2005 |
| CA | 2510883 | 12/2005 |
| CA | 2513037 | 2/2006 |
| CA | 2341283 | 3/2006 |
| CA | 2494395 | 6/2006 |
| CA | 2494034 | 7/2006 |
| CA | 2505431 | 9/2006 |
| CA | 2505458 | 9/2006 |
| CA | 2531189 | 9/2006 |
| CA | 2513605 | 1/2007 |
| CA | 2513614 | 1/2007 |
| CA | 2528731 | 1/2007 |
| CA | 2743336 | 1/2007 |
| CA | 2521187 | 3/2007 |
| CA | 2522387 | 4/2007 |
| CA | 2524151 | 4/2007 |
| CA | 2525904 | 5/2007 |
| CA | 2527797 | 5/2007 |
| CA | 2534200 | 6/2007 |
| CA | 2538020 | 8/2007 |
| CA | 2554689 | 1/2008 |
| CA | 2596403 | 2/2008 |
| CA | 2559217 | 3/2008 |
| CA | 2559353 | 3/2008 |
| CA | 2561463 | 3/2008 |
| CA | 2609744 | 5/2008 |
| CA | 2627320 | 9/2008 |
| CA | 2626486 | 2/2009 |
| CA | 2639032 | 3/2009 |
| CA | 2783567 | 3/2009 |
| CA | 2587107 | 7/2009 |
| CA | 2627053 | 9/2009 |
| CA | 2578907 | 4/2010 |
| CA | 2671880 | 4/2010 |
| CA | 2564777 | 8/2010 |
| CA | 2695689 | 9/2010 |
| CA | 2665580 | 11/2010 |
| CA | 2665589 | 11/2010 |
| CA | 2706704 | 1/2011 |
| CA | 2706705 | 1/2011 |
| CA | 2706706 | 1/2011 |
| CA | 2706707 | 1/2011 |
| CA | 2775891 | 1/2011 |
| CA | 2783670 | 1/2011 |
| CA | 2713636 | 2/2011 |
| CA | 2596627 | 4/2011 |
| CA | 2686017 | 5/2011 |
| CA | 2721118 | 5/2011 |
| CA | 2739632 | 11/2011 |
| CA | 2708744 | 12/2011 |
| CA | 2745105 | 12/2011 |
| CA | 2538489 | 1/2012 |
| CA | 2707624 | 1/2012 |
| CA | 2709336 | 1/2012 |
| CA | 2710676 | 2/2012 |
| CA | 2734475 | 5/2012 |
| CA | 2766611 | 7/2012 |
| CA | 2744070 | 12/2012 |
| CA | 2802894 | 1/2013 |
| CA | 2796109 | 5/2013 |
| CA | 2796120 | 5/2013 |
| CA | 2796131 | 5/2013 |
| CA | 2796134 | 5/2013 |
| CA | 2796177 | 5/2013 |
| CA | 2796165 | 6/2013 |
| CA | 2802958 | 7/2013 |
| CA | 2802963 | 7/2013 |
| CA | 2802972 | 7/2013 |
| CA | 2802975 | 7/2013 |
| CA | 2803470 | 7/2013 |
| CA | 2814924 | 10/2013 |
| CA | 2815395 | 10/2013 |
| CA | 2815408 | 10/2013 |
| CA | 2815421 | 10/2013 |
| CA | 2815427 | 10/2013 |
| EP | 1935226 | 6/2008 |
| WO | 2012/166629 | 12/2012 |

\* cited by examiner

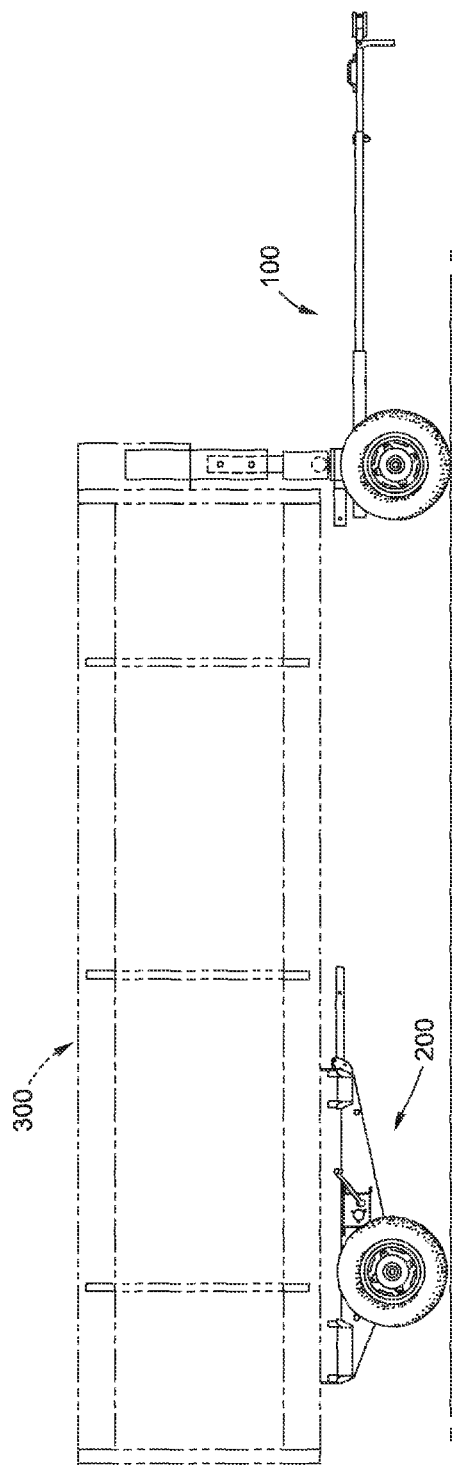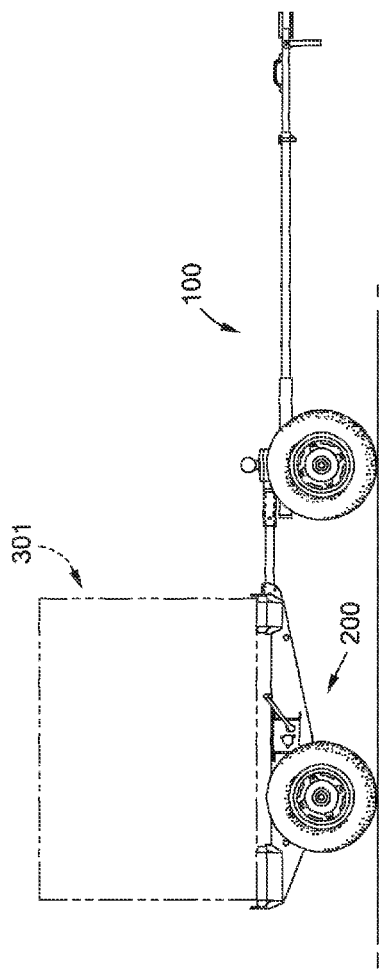

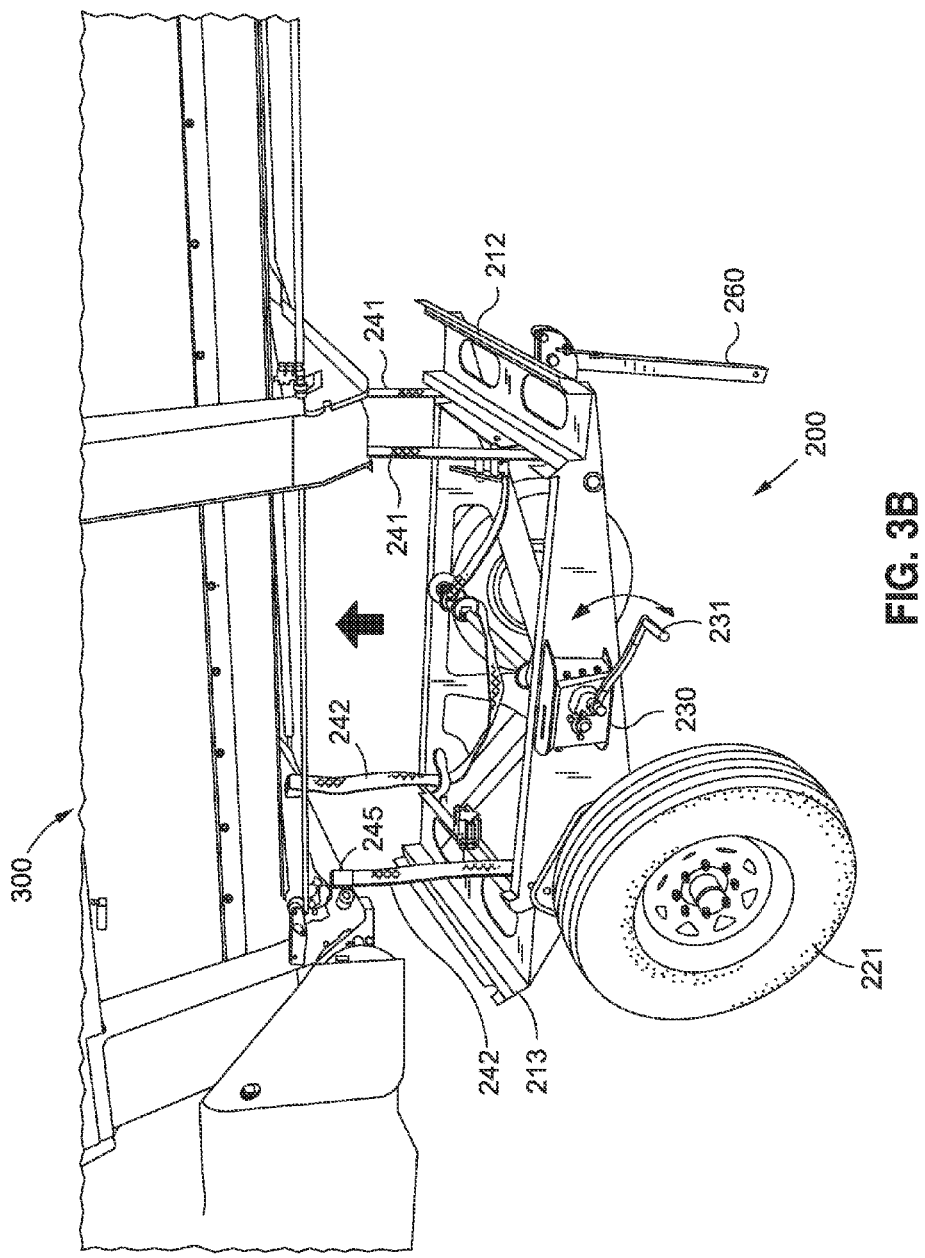

HARVESTING HEADER TRANSPORT APPARATUS AND METHOD

FIELD

This invention is in the field of mechanical devices for transporting farm equipment. In particular, the invention relates to devices that are useful in transporting a harvesting header assembly.

BACKGROUND

For the last century, the general trend in agriculture has been the consolidation of farmland into larger and larger farming operations. In 1900 the average farm size in the U.S. was about 140 acres, which today the average size is over 400. Because of the way in which farmlands were originally surveyed and parceled, and the way in which land is acquired, large farms generally do not consist of contiguous plots of land. As a result, in order to manage a farm, farm equipment frequently must be moved from one site to another using public roadways.

For some self-propelled equipment this presents little problem. However, other types of farm equipment, for example combines, cannot simply be driven down the road as the header portion is generally too wide to be accommodate by public roadways. Headers can be as much as 40 feet in width (about 12 m). The standard lane width in North America is about 12 feet (3.7 m). Thus, transporting a harvesting header while installed on the combine can be virtually impossible, as it would completely tie up traffic in both directions on most single lane roads, the routes typically available from field to field.

As a result, the header on a combine generally has to be removed from the combine, loaded onto a trailer lengthwise so that it can be safely transported to the next field where combining operations are to take place. A variety of prior art solutions have generally taken the obvious approach of removing the header and placing lengthwise on a trailer, the header and trailer being narrow enough to fit safely within a single lane of a roadway.

For example, U.S. Pat. No. 5,333,904 (Kuhns) discloses a trailer with supporting brackets onto which a harvesting header can be loaded and secured. The header is placed such that it is aligned longitudinally with the trailer, thereby allowing the header to be safely transported on public roadways. The fact that the header is placed onto the trailer means that this system cannot conveniently be manipulated by a single operator. Further, the use of brackets as support members means that the system is not readily adaptable to a variety of harvesting header configurations.

Later approaches to the problem include those such as are disclosed in U.S. Pat. No. 6,047,989 (Wood). That invention includes adjustable header support units that are configured to be more readily adapted to various header units. The solution, however, simply adds a plurality of mounting points for the supporting brackets, such that the user can select a particular bracket mount point to more or less align with the desired engagement point on the header. Given its size, the system is still not particularly amenable to use by a single operator, and stills retains defined attachment points, which may or may not perfectly align with sites on the header to which one might wish to secure the header to the trailer.

Others have provided trailers that allow the header to be rotated around the longitudinal axis in order to save space and make it easier to effect repairs. For example, U.S. Pat. No. 6,428,047 (Kaderabek) discloses a trailer that allows the header to be placed on the trailer and then pivotally rotated in order to either provide access to the underside of the header, or to save space for storage of the header in the off-season. A variation of this same theme is disclosed in U.S. Patent Publication No. 2009/0189382 (Nubel et al.). Still others have disclosed a trailer with a steerable wheel system on which headers can be transported, as is disclosed in U.S. Patent Publication No. 2010/0052289 (Frey et al.).

These prior art devices all suffer from similar limitations. For example, by using a fixed size trailer, a system may not be easily adapted for headers of difference sizes. More importantly, each of these prior art system are effectively a large trailer that is difficult for a single operator to manipulate. Generally, using prior art equipment requires two or three people in order to situate the trailer and move the header from the combine to the trailer.

Thus what is needed is a harvesting header transport system and accompanying method of use that simplifies the movement of a harvesting header from one site to another, and is compatible with typically public roadways that are used to transport farm equipment from site to site. In addition, what is further needed is a system and method that can be used by a single worker.

SUMMARY

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

The present invention comprises front and rear carriers that can be attached to the bottom plane the combine header. When secured in place, these front and were carriers cooperatively can bear the weight of the header during transport. The front carrier is designed to include a steerable wheel assembly to make trailing the carriers and header behind a towing vehicle easier. The rear carrier includes and extendable strap system connected to a winch. The straps can be secured to the structure of the header and once in place the winch can be operated to attract the straps lifting the rear carrier into place underneath the header. The front carrier includes a header support structure that connects the front end of the header to the front carrier wheel assembly thus supporting the other end of the header.

The invention also provides a method of installing and securing the front and rear carrier support systems to the header, and then once in place connecting the combined components to a towing vehicle for transport of the header to a desired location. The wheel assemblies are designed such that the wheels will be oriented substantially parallel to the longitudinal axis of the header so that the header can be easily told lengthwise down a standard roadway.

Thus, the present invention provides a system for road transport of a harvesting header, said header including a front end proximate to and representing the front of the header when oriented for towing in transport mode and a back end at the opposing end of the header from the front end, the system comprising: a front carrier support connected to the bottom plane of the header at or near the front end of the header; a front carrier comprising a steerable front wheel assembly with a towing member and hitch attached thereto, said front carrier adapted to attachably engage the front header support to attach the front carrier to the header; a rear carrier comprising: a rear carrier frame which can be attached to the bottom plane of the header in a rear carrier support zone by header connectors thereon; at least one rear wheel assembly attached to the rear carrier frame such that the at least one rear wheel assembly is oriented in the direction of transport of the header when the rear carrier frame is attached to the rear carrier support zone; more than one extendable header strap attached thereto, each header strap having a header hook on the distal end thereof which can be connected to the header in the rear carrier support zone wherein when the rear carrier is placed on the ground beneath the header in a raised position and the extended header straps are secured to the header using their header hooks, by retracting those header straps from their extended positions the rear carrier is lifted into position in the rear carrier support zone on the bottom plane of the header, where the rear carrier can be connected to the header by the header connectors; and wherein the front carrier can be attached to the header by placement of the front carrier on the ground below the header with the rear carrier attached thereto, in alignment with the front carrier support, and the header is lowered to align and attach the front carrier to the front carrier support; wherein upon attachment of the header to the front carrier and rear carrier, the combined unit is trailable behind a power unit hitched thereto.

In some embodiments, the header straps are connected to a winch on the rear carrier frame, whereby operation of the winch will result in the extension or retraction of the header straps.

In some embodiments, the front header support comprises a plurality of members adapted to be telescoped within one another, and locking means to restrict movement of said members once the header support has a desired length.

In some embodiments, the rear carrier frame further comprises strap guides, the strap guides configured to bear a portion of the tension applied to the header straps when the winch is operated.

In some embodiments, the winch further comprises a motor, said motor effective to power the extension or retraction of the header straps. In some embodiments, the straps further comprise means to reversibly secure the strap to the header. In some embodiments, the means to reversibly secure the header strap to the header comprise at least one of a hook, and a snap.

The present invention further provides a method of transporting a harvesting header, said header including a front end proximate to and representing the front of the header when oriented for towing in transport mode and a back end at the opposing end of the header from the front end, the method comprising: providing a header to be transported, wherein the header is elevated above the ground surface, said header including a front carrier support connected to the bottom plane of the header at or near the front end, wherein the bottom plane of the header at or near the back end thereof comprises a rear carrier support zone; positioning a rear carrier on the ground beneath the rear carrier support zone of the header, said rear carrier comprising: a rear carrier frame which can be attached to the bottom plane of the header in the rear carrier support zone by header connectors thereon; at least one rear wheel assembly attached to the rear carrier frame such that the at least one rear wheel assembly is oriented in the direction of transport of the header when the rear carrier frame is attached to the rear carrier support zone; more than one extendable header strap attached thereto, each header strap having a header hook on the distal end thereof which can be connected to the header in the rear carrier support zone; extending the extendable header straps so that the extended header straps can reach attachment points on the header beneath the rear carrier support zone where the header hooks are attached; retracting the header straps, lifting the rear carrier into position in the rear carrier support zone on the bottom plane of the header, where the rear carrier can be connected to the header by the header connectors; placing a front carrier on the ground below the front end of the header, in alignment with the front carrier support, said front carrier comprising a steerable front wheel assembly with a towing member and hitch attached thereto, and adapted to attachably engage the front header support to attach the front carrier to the header; lowering the header to align and attach the front carrier to the front carrier support; wherein upon attachment of the header to the front carrier and rear carrier, the combined unit is trailable behind a power unit hitched thereto.

In some embodiments of the method, the front carrier support further comprises a plurality of members adapted to be telescoped within one another, and locking means to restrict movement of said members once the front carrier support has been telescoped to a desired length.

In some embodiments of the method, the header is secured to the front carrier before the rear carrier. In some embodiments of the method, the header is secured to the rear carrier before the front carrier.

In some embodiments of the method, the rear carrier further comprises a winch on the rear carrier frame, attached to the header straps, whereby operation of the winch will result in the extension or retraction of the header straps.

In some embodiments of the method, once the front and rear carriers are secured to the header, the header is lowered until substantially all the weight of the header is borne by the front and rear carriers acting cooperatively. In some embodiments, the method further comprises disconnecting the header from the combine once substantially all the weight of the header is borne by the front and rear carriers.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numerals, and where:

FIGS. 1A and 1B are side views of embodiments of the present invention.

FIG. 3B is a perspective view of an embodiment of a rear carrier of the present invention secured to the combine header with straps and ready to be winched into position.

DETAILED DESCRIPTION

Prior art transport systems for harvesting headers have several limitations. In some instances the systems require several people in order to position and load the header onto to trailer or other transport means. Still other systems are not readily adaptable to headers of different sizes. The present invention solves a number of these issues and provides a substantially universally adaptable transport system for harvesting headers and other difficult to transport farm equipment. Significantly, a single user can effectively employ the present invention.

In the present invention, the term "end" as it relates to the harvesting header is taken to refer to any position between the center of balance of and the physical end of the header. The term therefore should not be taken to strictly mean the absolute end of the harvesting header. As a result, when referring below to placement of the front and rear carriers with respect to an "end" of the harvesting header, what is meant is that the front carrier can be positioned at some location away from the center of balance toward, and including a physical end of the harvesting header, and the rear carrier will be positioned at some location on the other side of the center of balance and toward or at the opposite physical end of the harvesting header.

The invention comprises in some embodiments a front carrier 100 and rear carrier 200 that are configured to accept a harvesting header 300 for transport, as depicted in FIGS. 1A and 1B. As shown, the harvesting header is supported by the front and rear carriers in such a way that the header can be transported lengthwise along a standard roadway. Referring to the remaining figures, additional detail regarding the construction and operation of the invention will become apparent.

Figure 2A:
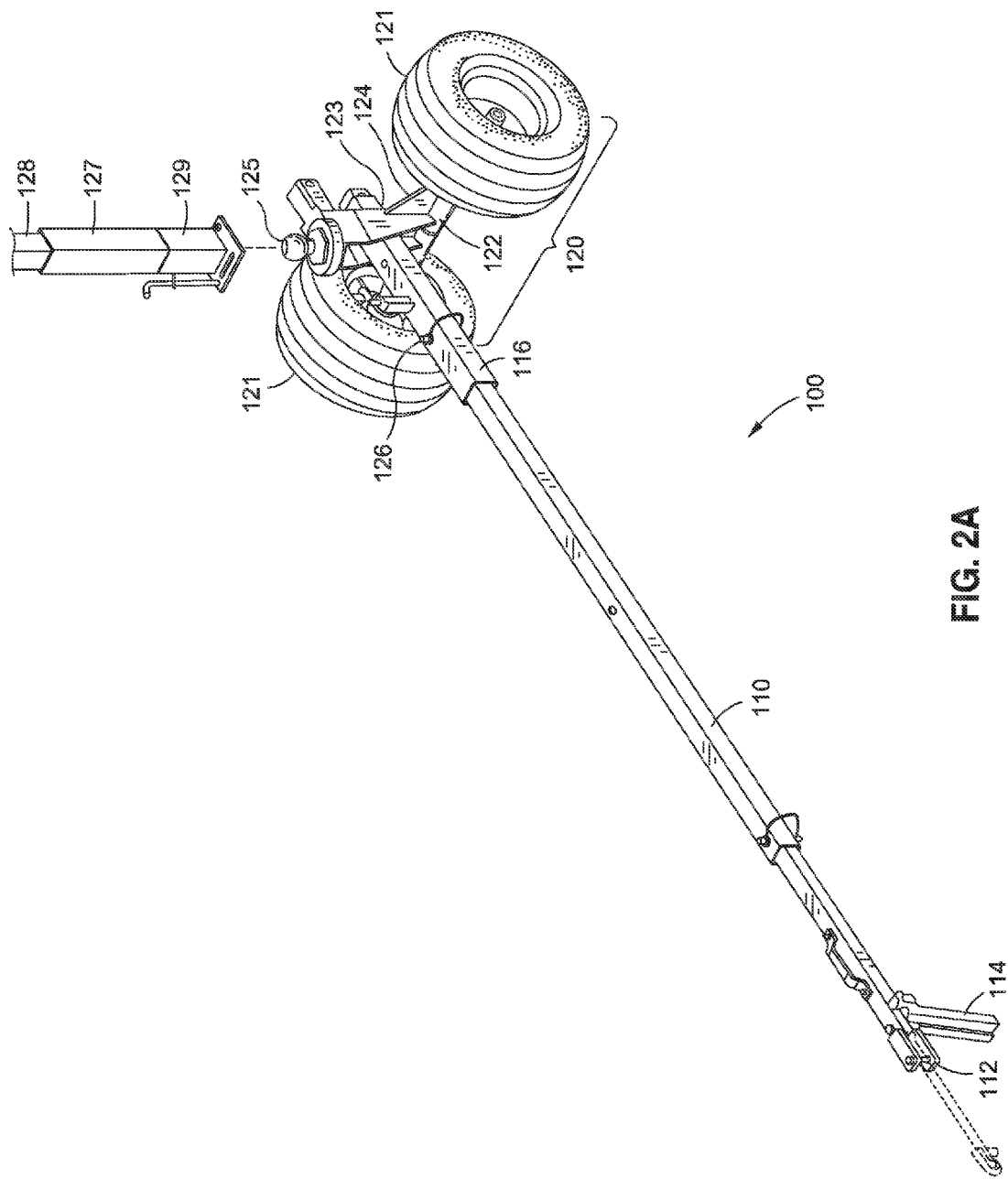
FIG. 2A is a perspective view of an embodiment of the front carrier part of the present invention.

FIG. 2A depicts an embodiment of the front carrier of the invention. In one aspect of the present invention, the front carrier comprises a towing member 110 a front carrier wheel assembly 120 and a hitching means 112 that permits the towing member to be connected to a vehicle used for transporting a harvesting header. The front carrier wheel assembly comprises wheels 121 connected to each other by an axle 122. In a preferred embodiment, the front carrier wheel assembly comprises two wheels, although additional wheels can be include in the assembly if desired to more effectively support or distribute the weight of the harvesting header supported by the front carrier. Wheels suitable for use with the invention will be obvious to those of skill in the art, and generally typical pneumatic tires can be used. In addition, the front wheel assembly is configured such that the front wheel assembly portion can be steerable, those simplifying towing and maneuvering of the combine header once it is secured to the support system as described by the present invention.

The wheels and axle assembly are connected to the towing member via an axle mount 124. In some embodiments the axle mount may be attached directly to the towing member. In other embodiments, as shown in FIG. 2A, the axle mount can be attached to a towing member receiver 116 by a portion of the header support mount 123. In other embodiments, the axle can be attached directly to the towing member receiver. The towing member receiver can be configured to be reversibly attachable to the towing member. Providing a separate towing member receiver component permits the towing member to be removed from the wheel assembly, such as might be desired for storage thus minimizing the space required to store the various components of the present invention.

Where a towing member receiver is provided it can be secured to the towing member by a fastener 126. Suitable fasteners can include nut and bolt combinations, locking pins, and other like components.

The front carrier also comprises a structure designed to support one end of a harvesting header. In the embodiment illustrated in FIGS. 2A and 2B, the carrier includes a header support mount 123. The header support mount is connected to the towing member, in some cases, by attaching to the towing member receiver. For improved strength and rigidity, the header support mount can also be attached to the axle mount 124. The header support mount further includes a front connector 125 that is designed to receive an end of a header support member 127. In some embodiments, the front connector can be a typical ball hitch. One end of the header support member is designed to be attachable to a portion of the harvesting header, typically a part of the header frame superstructure, via a front header attachment 129. The front carrier and associated support structures are generally designed to be attached to the bottom plane of the header, at or near the front end of the header, although in some embodiments it may be desirable to support the front end of the header by other means.

In some cases the front header support can comprise a plurality of members that are adapted to be telescoped within one another. In addition a telescoping front header support can further include locking means to restrict the movement of the telescoping members once the header support has been extended or retracted to a desired length. The front and/or rear carrier assemblies as described herein may further include shock absorbing means in order to isolate the combine header from vibration experienced during transport.

The front header attachment can comprise any kind of removable means of securing components, including nut and bolt combinations, locking pins, or a post onto which an end of the header support member can be inserted. Where a post is used, it may also include a locking pin or like arrangement to prevent the header support member from sliding off the pinion during transport. Where a post is used, the components can be designed such that the header support member inserts into an appropriately sized hollow post, or vice versa.

Figure 2B:
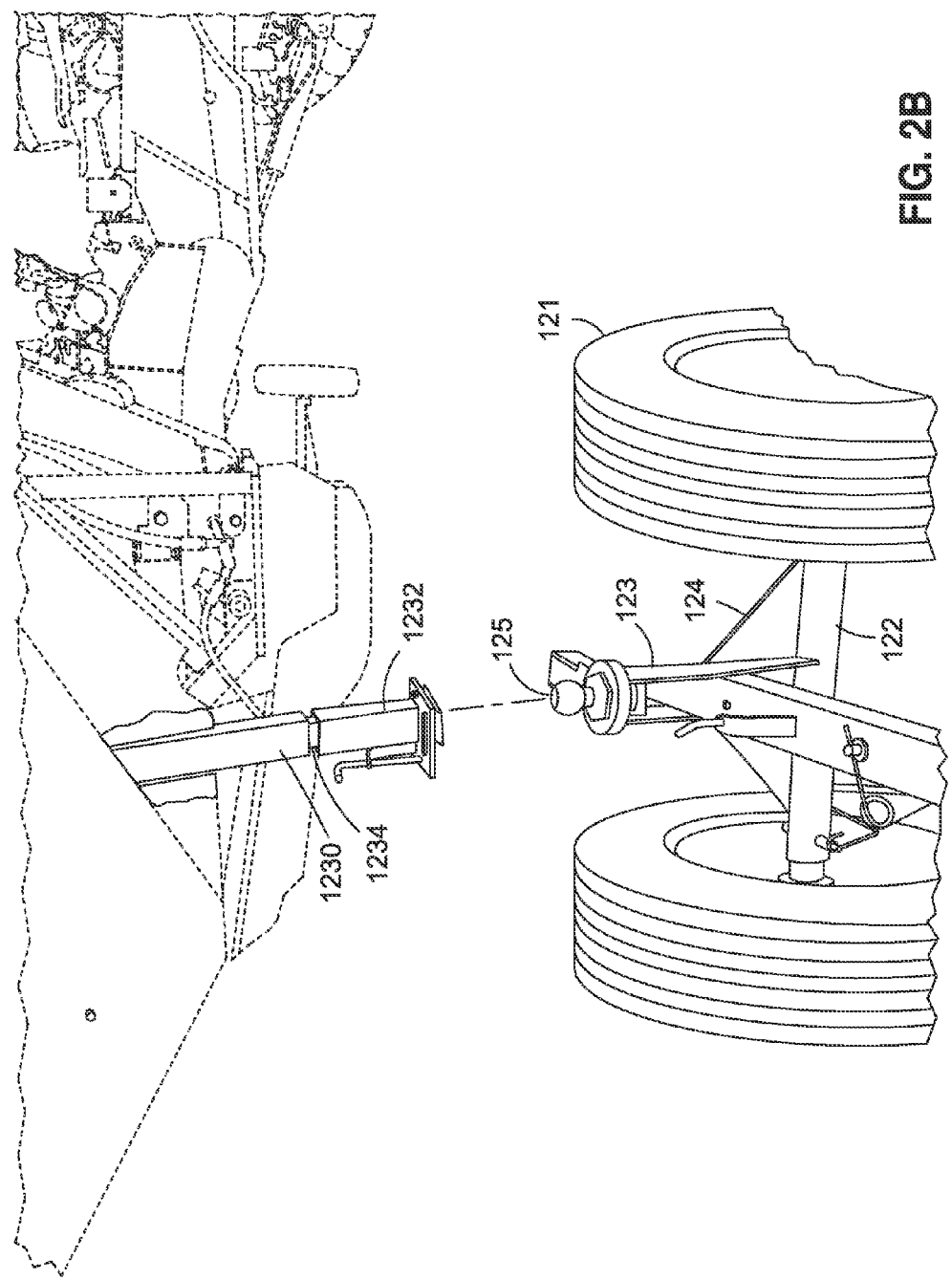
FIG. 2B is a perspective view of an embodiment of a front carrier and front header attachment with the header attachment secured to the header, and the front carrier ready to be secured to the header attachment.
Figure 2C:
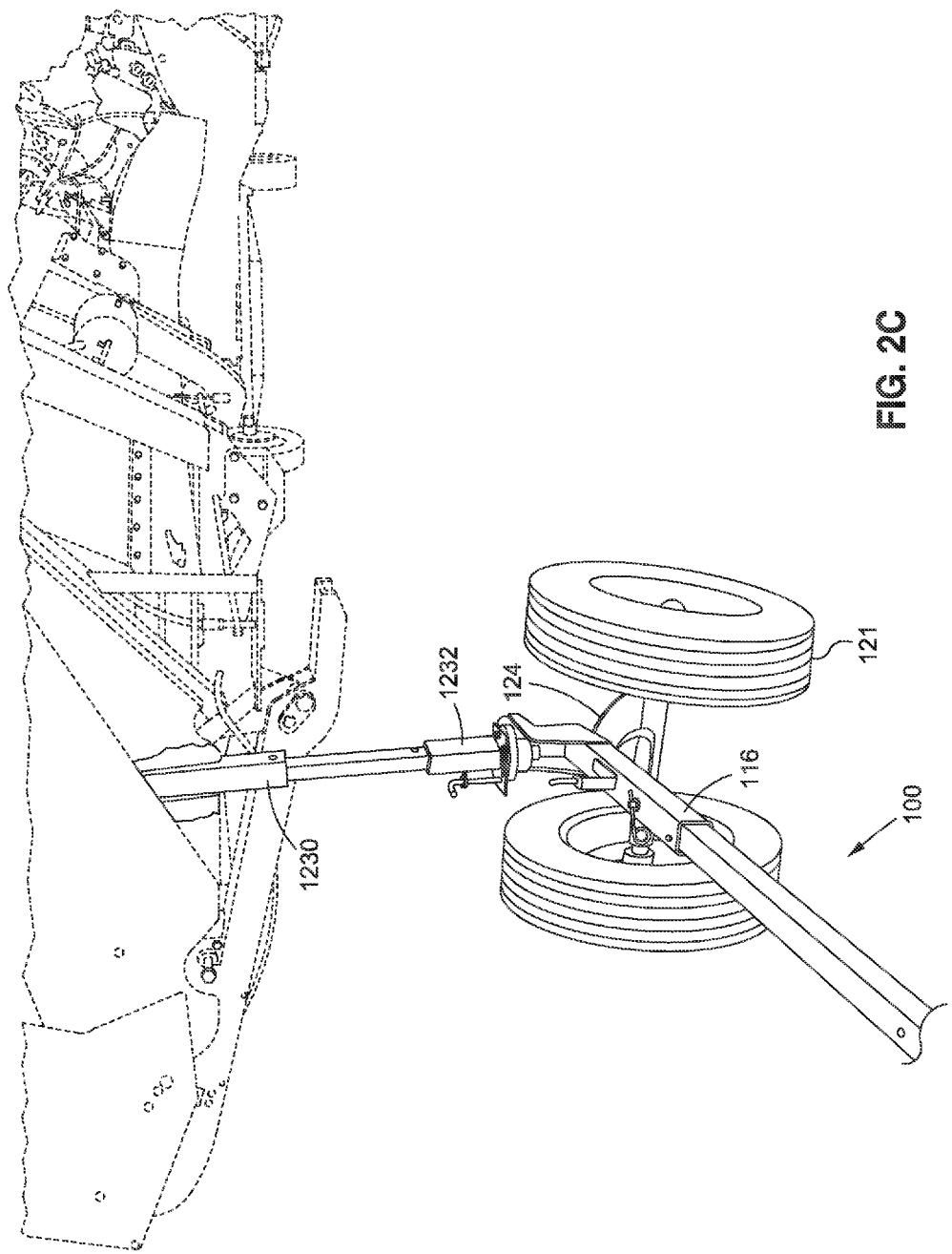
FIG. 2C is a perspective view of an embodiment of a front carrier of the present invention secured to a combiner header via the front header attachment.

The opposite end of the header support member is designed to engage the front connector. In some embodiments, the end of the header support member that engages the front connector can simply be a tube with an inside opening large enough to accept the connector, for example a ball hitch of a known diameter. In addition, and as shown in FIGS. 2B and 2C, the header support member can comprise an upper member 1230 that attaches to the harvesting header, and which slidably engages a lower member 1232 which includes the portion that engages the front connector.

In use, this allows the header support member to be attached to the harvesting header, and then the lower portion extended into position to engage the front connector. Then, when the harvesting header is ready to be lower, the upper and lower member simply slide relative to each other to effectively shorten the length of the header support member. The lower member can further include a flange 1234 that provides a stop that prevents further shortening of the header support member past a certain pre-determined length. FIGS. 2B and 2C depict the header support member in the retracted and extended configurations, respectively. As can be easily appreciated with reference to FIG. 2C, as the combined header is lowered, the upper member will slide over the lower member until the upper member reaches the flange, at which no further shortening will occur, and a portion of the weight of the harvesting header will be supported by the front carrier.

For improved security when transporting the harvesting header, a safety 126 can be included to insure that the header support member does not inadvertently disengage from the header support member mount during transport. Such safety devices include chains, locking pins, or nut and bolt arrangements well known in the art.

Figure 3A:
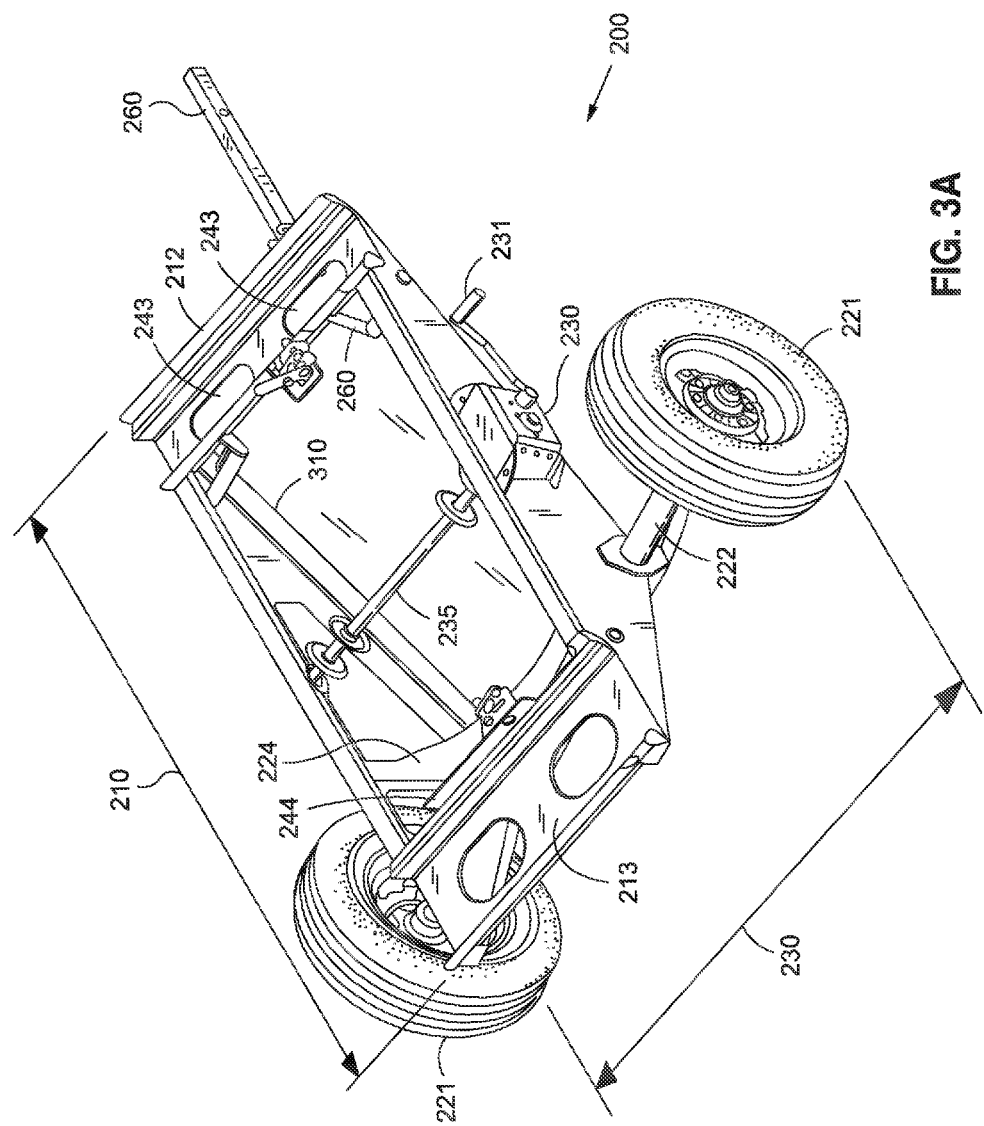
FIG. 3A is a perspective view of an embodiment of a rear carrier of the present invention.

The invention further comprises a rear carrier 200 that in cooperation with the front carrier is designed to support a harvesting header during transport and/or storage. In a preferred embodiment, depicted in FIG. 3A, the rear carrier comprises a frame 210 that serves as a support for components adapted to receive the harvesting header, and at least one rear wheel assembly 220 that is attached to the rear carrier. Attachment of the rear carrier frame is preferably to the bottom plane of the header within a region termed the rear carrier support zone.

Analogous to the front carrier, the wheel assembly comprises wheels 221 connected by an axle 222. In a preferred embodiment, the rear carrier wheel assembly comprises two wheels, however, as discussed above for the front carrier, more than two wheels may be desired in order to support heavier loads or to distribute the load being carried. For example, in some embodiments it is conceivable that the present invention could be designed to carry more than one harvesting header, with a second header "stacked" onto the first. In these cases, a more robust wheel assembly on both the front and rear carrier assemblies might be required. The wheels on the rear wheel assembly will preferably already be oriented in the desired direction of transport when the rear carrier frame is attached to the rear carrier.

The rear carrier further includes a first support member 212 and second support member 213 connected to the frame, and which are configured to cooperate to support an end of the harvesting header, opposite to that supported by the front carrier. The support members are situated generally perpendicular to the longitudinal axis of the rear carrier, although other configurations and placements than those shown in FIG. 3B can be employed without departing from the scope of the invention. The number and location of support members will be obvious to those of skill in the art.

The rear carrier further comprises a winch and an extendable header strap system designed to engage and secure the harvesting header to the rear carrier. As shown in the accompanying FIGS. 3A-3C, in one embodiment a winch 230 is situated on one side of the frame. The winch can be manually operated, in which case it will include a handle 231 to allow a user to operate the winch mechanism. The winch can also include typical features such as a lock, which locks the winch in a position, and a release in order to disengage the lock. In some embodiments it may be desirable to provide a motorized winch rather than one that is operated manually, such as, for example, as shown at 232 in FIG. 4. In such cases, the winch will include some form of power supply, for example, a battery as in the case of an electric motor, or some means of connecting the motor to an external power supply.

The drive mechanism of the winch is connected to a winch axle 235, which passes through and is supported by members of the frame. The winch axle engages the proximal end of one or more straps 240, the straps designed to reversibly connect the harvesting header to the rear carrier. As can be appreciated, the winch can be operated to permit the extension or retraction of the header straps depending on whether the user is securing or removing the rear carrier from the header.

In the depicted embodiment, four straps are provided, two front straps 241 and two rear straps 242. In the depicted embodiment shown in FIGS. 3A-3C, the straps extend from the winch axle and are fed through guides provided in the frame. As shown, the two front straps can be configured to pass through respective front strap guides 243, while the two rear straps can be configured to be fed through corresponding rear strap guides 244. The distal ends of each strap can then be pulled upwards where they can engage a location on the harvesting header via strap fasteners 245 located substantially at the end of each strap. In some embodiments, the strap guides may simply provide a smooth surface for straps to glide over. The strap guide will also be operative to bear a portion of the tension applied to the header straps when the winch mechanism is operated. In some other embodiments, it may be desirable to provide a roller mechanism over which the strap runs, the roller mechanism substantially reducing friction between the strap and its guide, and thereby reducing wear and tear on straps.

Generally, the header straps will further comprise means to allow them to be reversibly secured to the header structure. In some cases the means to reversibly secure the headers to the header will comprise at least one of a hook, and a snap, or other analogous structures. Strap fasteners can comprise any of a number of structures, including open hooks that engage a portion of the harvesting header superstructure. The precise nature of the means of fastening a strap to the harvesting header is not considered limiting to the scope of the invention located at the distal end of each strap.

For example, the distal end of the strap may include a hook or eye designed to engage a complimentary structure located some distance away from the distal end of the strap. In this configuration one will appreciate that to secure the strap to the header, the end of the strap can be passed through some portion of the header structure and then looped back on itself to secure the end back to the strap. In some embodiments, the header strap hook might engage a complementary structure on the header without requiring any portion of the strap to directly engage or otherwise wrap around a portion of the header structure.

The rear carrier also includes a stand 260 attached to the frame. In some embodiments the stand is designed to be movable. Thus, when the rear carrier is being positioned, or when being stored, the stand maintains the rear carrier substantially level to the surface it is sitting on. This improves the ease of use of the rear carrier in terms of positioning it with respect to the harvesting header. It also keeps components of the frame off the ground thereby preventing inadvertent damage to the front of the rear carrier frame structure. Conveniently, the stand can be pivotally mounted such that when not in use it can be rotated and secured out of the way. The stand can further include means of securing it in a desired position, such as through the use of a locking pin to engage the stand member with respect to a mount that connects the stand to the frame. In essence, the operation of the stand is analogous to that of a kickstand and so those of skill will readily appreciate how the stand operates and the various configurations that are useable in conjunction with the present invention.

The apparatus of the present invention as described herein provides additional advantages in a method of securing and transporting a harvesting header that improves significantly upon prior art solutions to this problem. A fundamental limitation in prior art apparatus is the need to have multiple people involved in the trailering of the harvesting header. This is obviated by the present invention.

In one aspect, the front carrier will be positioned between the center of balance and one end of the harvesting header to be transported, under the bottom plane of the header. The relatively small size of the front carrier makes it easily amenable to moving by one person. Once in the desired position, a user can then attach the front carrier to the header via the header support member 127. As discussed above, one end of the header support member engages a header support member mount 123 on the frame of the front carrier, while the opposite end engages a portion of the harvesting header superstructure. The header support member is designed to be able to pivot about the front connector.

As discussed in some embodiments the front connector comprises a ball hitch and the header support member is designed to be able to engage and pivotally rotate laterally about the hitch such that the front carrier can more accurately track the vehicle towing the harvesting header. The end of the header support member that engages the harvesting header can be attached in any number of ways including clamping to the superstructure, bolting to holes in the harvesting header framing that are designed to accept the header support member, and other similar attachments.

In some cases it may be desirable to design the system such that the mounting point on the harvesting header is pivotally attached to the header support allowing that end of the member to rotate laterally. In either case, in preferred embodiments at least one end of the header support member will be pivotally connected to its respective mounting point in order to permit the lateral rotation of the front carrier relative to the longitudinal axis of the harvesting header during positioning of the front carrier and/or towing of the header.

The rear carrier provides a completely novel method of connecting a transport system to a harvesting header. In prior art transport systems, the harvesting header is lowered onto a trailer, secured, and then disengaged from the rest of the combine vehicle. In the present case, the inventors have developed the concept of connecting the rear carrier to the combine and then raising the rear carrier into position, and finally securing the harvesting header so that it is ready for transport.

Figure 1C:
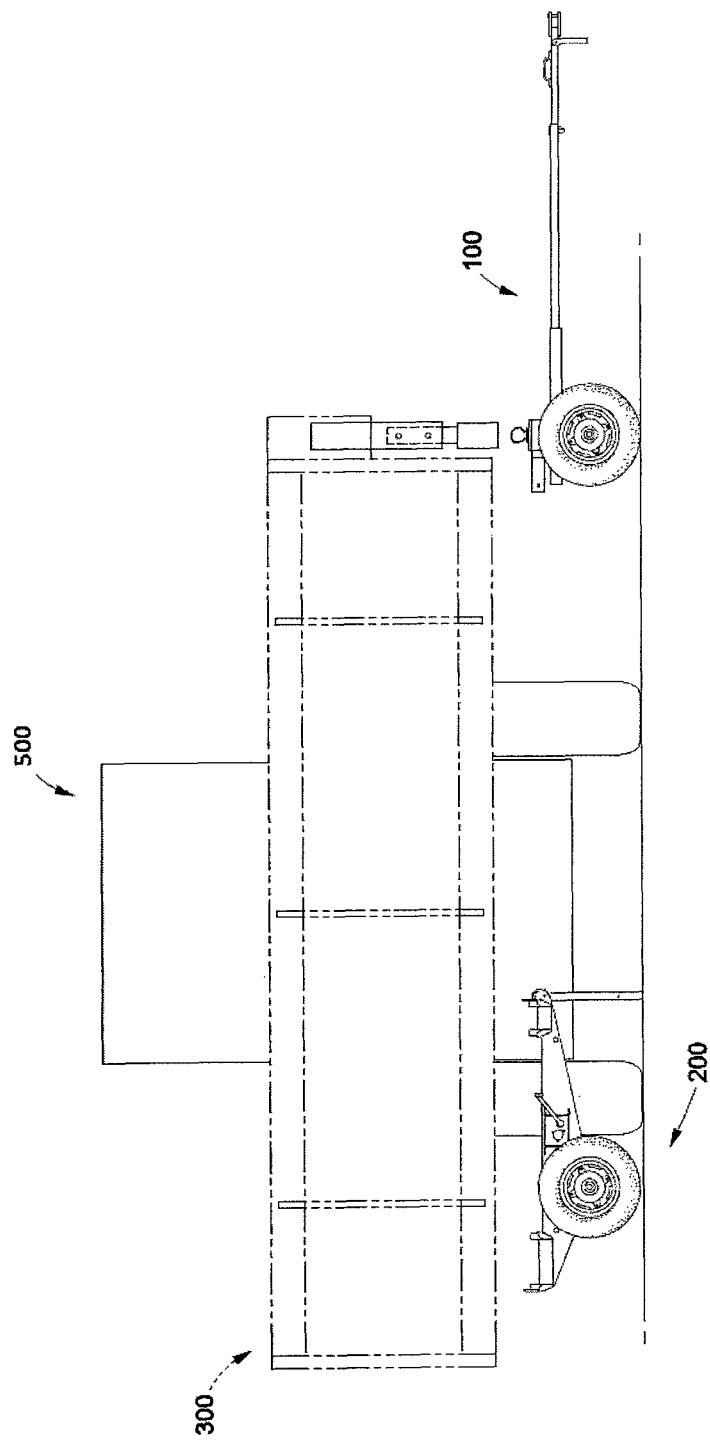
FIG. 1C is a side view of an embodiment of the invention.

Therefore, in accordance with an embodiment of a method of transporting a harvesting header, the rear carrier is first positioned at a point under the bottom plane of the harvesting header between the center of balance and an end of the harvesting header opposite to that where the user intends to (or already has) positioned the front carrier. Referring to FIG. 1C, at this stage the harvesting header 300 is attached to the combine or harvesting equipment 500 and positioned in an elevated position so that the user can easily place the rear carrier 200 under the header.

Releasing the locking mechanism on the winch, the user is able to fully unwind and/or extend the straps from the winch axle and if there are not already so positioned, to pass each strap through its appropriate strap guide in cases where the apparatus includes one or more strap guides. Each strap will then be attached to a location on the harvesting header as described above, and as depicted in FIG. 3B. Once each strap is in place, the user will operate the winch to roll the straps back onto the winch axle, thus retracting the straps. Operating the winch can be performed manually using a winch handle as depicted in the accompanying drawings, or via activation of a motorized winch in embodiment employing that type of a winch drive mechanisms.

Figure 3C:
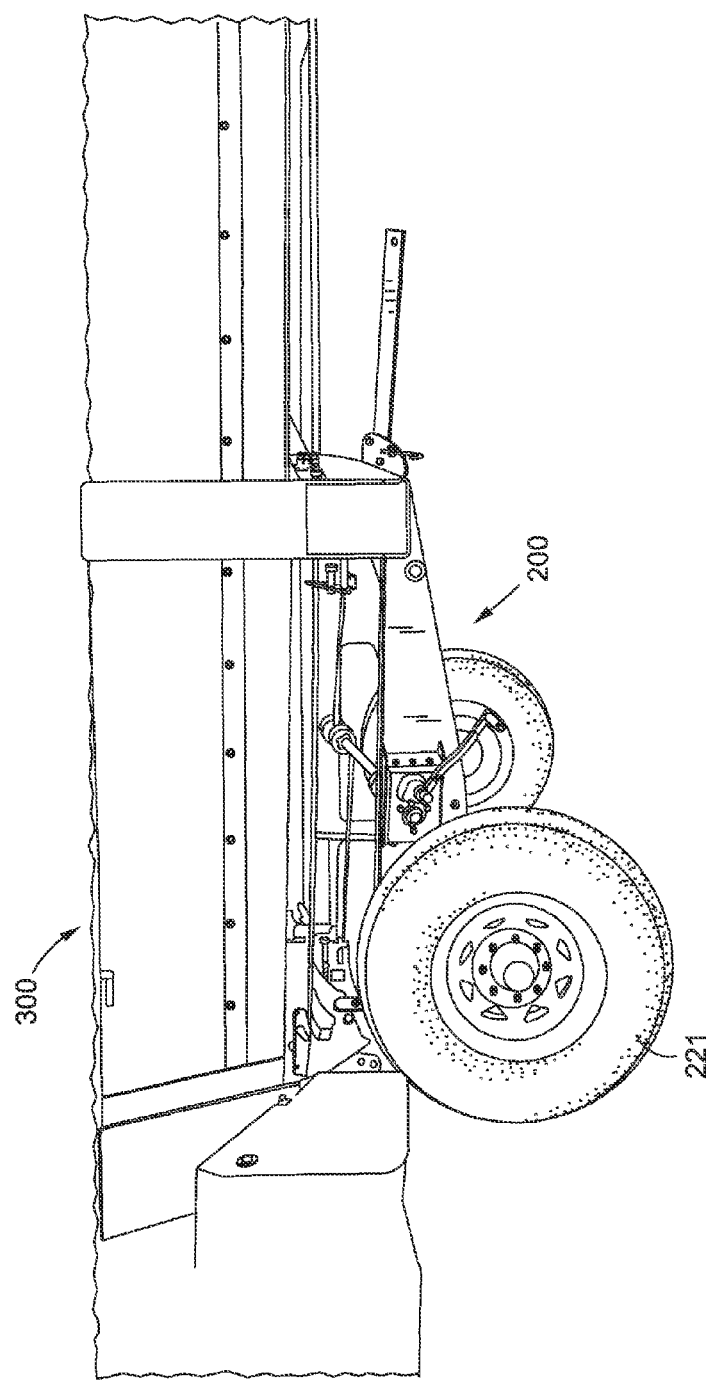
FIG. 3C is a perspective view of an embodiment of a rear carrier of the present invention secured to the combine header and winched into position.
Figure 4:
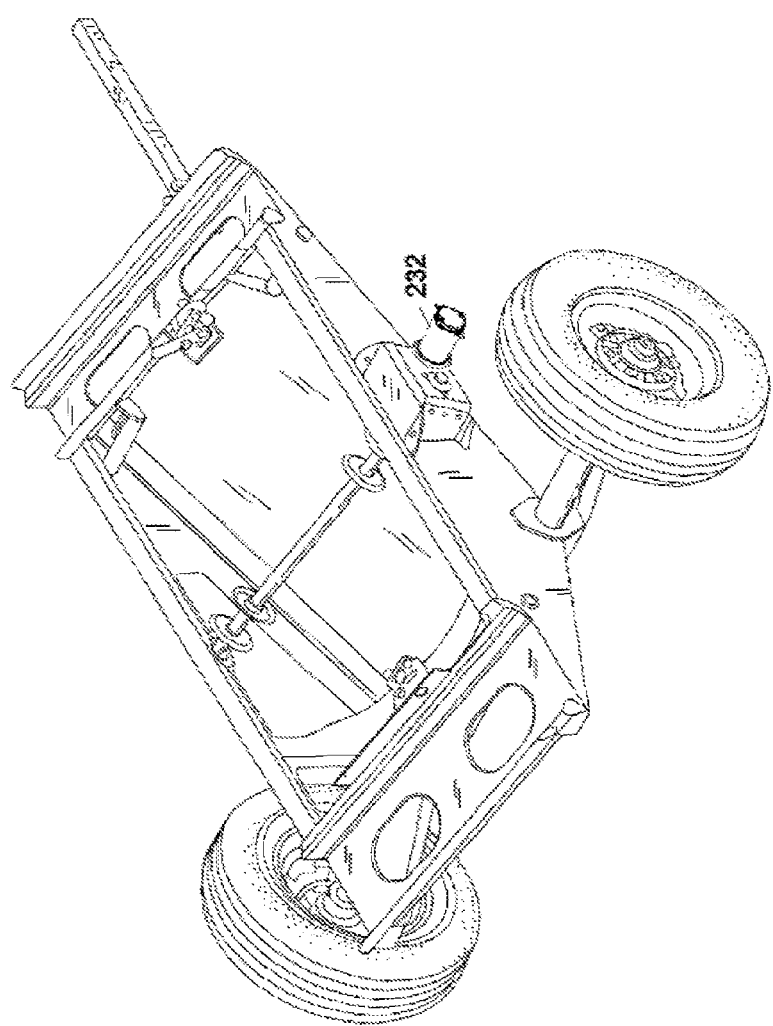
FIG. 4 is a perspective view of a rear carrier in accordance with an embodiment of the invention.

Winding the straps onto the axle will eventually take the slack out of the straps and when sufficient tensions is created, the rear carrier will be lifted off the ground and upwards towards the harvesting header where it will eventually be secured the rear carrier support zone. The strap guides operate to transmit the tension applied on the straps into an upwardly acting bias force sufficient to lift the rear carrier into position, as shown in FIG. 3C.

The winch will be operated until the user determines that the rear carrier is positioned securely under the harvesting header and in the desired position within the rear carrier support zone. Once that is achieved the winch can be placed in the locked position in order to maintain the tension on the straps. Once satisfied the rear and front carriers are properly secured (as can appreciated by reference to FIGS. 2C and 3C, the user can then lower the harvesting header towards the ground such that the wheels of the rear carrier are now on the ground supporting a portion of the weight of the header, with the remainder of the load being supported by the front carrier, as shown in FIG. 1A. In addition to being able to conveniently transport a combine header as shown in FIG. 1A, the invention can be adapted to secure and transport other bulky loads 301 as shown in FIG. 1B.

In some embodiments of the method, the user can position and install the rear carrier support as described above, and then once the rear carrier support is in position, then connect the front header support, and then lower the header to align and attach the front carrier to the front carrier support. It will be apparent to those of skill in the art that the precise order in which the front and rear carrier supports are secured to the header are not limiting to the scope and practice of the invention. In some cases, a user may decide to first secure the front carrier support and then the rear, or vice versa. In either case, once the front and rear carrier supports have been secured to the header and the header lowered such that the entire weight of the header is borne by the front and rear carriers acting cooperatively, the header can then be safely disconnected from the combine.

Depending on the preferences of the user, in some cases it may be desired to secure the rear carrier in place, then attach the header support member at a location towards the other end of the carrier, and then secure the front carrier to the header support member prior to lowering the harvesting header. In other cases, it might be desired to secure the rear carrier in position, then lower the harvesting header part way to the ground, and then position the front carrier under the header support member, and then lower the header the remaining distance to engage the header support member to the front connector mount on the front carrier. As can be seen the specific steps can be performed in various orders and achieve the same result of securing the harvesting header to the front and rear carriers of the present invention. The preferred order of executing these steps will be one of personal preference of the user.

Finally, once the front and rear carriers are positioned and secured, and the harvesting header is lowered such that the weight of the header is supported on the carrier system, the header can then be disconnected from the combine. At this stage the harvesting header is ready for transport and can simply be towed away after connecting the front carrier to a hitch or other like connecting on the vehicle to be used to tow the header. Upon moving the header to the desired site, the steps by which the header was secured to the front and rear carrier are simply reversed. In some cases, the harvesting header may be left mounted on the carrier system as may be desired for storage after the growing season is over.

Thus, it is clear that the described embodiments provide an improved device and method of transporting a harvesting header. In addition, it will be apparent to those of skill in the art that by routine modification the present invention can be optimized for use in a wide range of conditions and applications, and with various models of farm equipment. It will also be obvious to those of skill in the art that there are various ways and designs with which to produce the apparatus and methods of the present invention. The illustrated embodiments are therefore not intended to limit the scope of the invention, but to provide examples of the apparatus and method to enable those of skill in the art to appreciate the inventive concept.

Those skilled in the art will recognize that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A system for road transport of a harvesting header, said header including a front end representing the front of the header when oriented for towing in transport mode and a back end at the opposing end of the header from the front end, the system comprising:
   the header;
   a front header support connected to the bottom plane of the header at or near the front end of the header;
   a front carrier comprising a steerable front wheel assembly with a towing member and hitch attached thereto, said front carrier adapted to attachably engage the front header support to attach the front carrier to the header;
   a rear carrier comprising:
      a rear carrier frame which can be attached to the bottom plane of the header in a rear carrier support zone by header connectors thereon;
      at least one rear wheel assembly attached to the rear carrier frame such that the at least one rear wheel assembly is oriented in the direction of transport of the header when the rear carrier frame is attached to the rear carrier support zone;
      more than one extendable header strap attached thereto, each header strap having a header strap connector configured to reversibly secure the header strap to the header on the distal end thereof which can be connected to the header in the rear carrier support zone; and
      a retractor device coupled to the header straps and operable to substantially simultaneously shorten respective effective lengths of each of the header straps when the rear carrier is placed on the ground beneath the header in a raised position and the extended header straps are secured to the header in spaced apart relation using their respective header strap connectors, by retracting those header straps from their extended positions to cause the rear carrier to be lifted into position in the rear carrier support zone on the bottom plane of the header, where the rear carrier can be connected to the header by the header connectors; and
   wherein the front carrier can be attached to the header by placement of the front carrier on the ground below the header with the rear carrier attached thereto, in alignment with the front header support, and the header is lowered to align and attach the front carrier to the front header support;
   wherein upon attachment of the header to the front carrier and rear carrier, the combined unit is trailable behind a power unit hitched thereto.

2. The system of claim 1 wherein the header straps are connected to a winch on the rear carrier frame, whereby operation of the winch will result in the extension or retraction of the header straps.

3. The system of claim 1, wherein the front header support comprises a plurality of members adapted to be telescoped within one another, and locking means to restrict movement of said members once the header support has a desired length.

4. The system of claim 2, wherein the rear carrier frame further comprises strap guides, the strap guides configured to bear a portion of the tension applied to the header straps when the header straps are retracted.

5. The system of claim 1, further comprising a winch comprising a motor, said motor effective to power the extension or retraction of the header straps.

6. The system of claim 1, wherein the header strap connectors comprise at least one of a hook and a snap.

7. The system of claim 1 further comprising harvesting equipment engaged with the header to hold the header above the ground.

8. An apparatus comprising:
   a harvesting header;
   a harvesting header carrier; and
   a position adjustment mechanism operable to lift the harvesting header carrier off a support surface into engagement with the harvesting header;
   wherein the position adjustment mechanism comprises:
      a plurality of flexible elongate supports, each of the flexible elongate supports connected to the harvesting header at spaced apart positions and connected to the harvesting header carrier;
      a retractor device coupled to the plurality of flexible elongate supports and operable to substantially simultaneously retract each of the flexible elongate supports to shorten respective effective lengths of each of the flexible elongate supports and cause the harvesting header carrier to be lifted towards and into engagement with the harvesting header.

9. The apparatus of claim 8 further comprising respective header connectors coupled to each of the plurality of flexible elongate supports and removably connected to the harvesting header.

10. The apparatus of claim 9 wherein each of the header connectors comprises a hook or a snap connector.

11. The apparatus of claim 8 wherein the retractor device is connected to the harvesting header carrier.

12. The apparatus of claim 8 wherein each of the plurality of flexible elongate supports comprises at least one strap.

13. The apparatus of claim 8 wherein the retractor device comprises a winch.

14. The apparatus of claim 13 wherein the retractor device comprises guides operable to guide the plurality of flexible elongate supports to the winch and to bear tension applied to the plurality of flexible elongate supports when the winch is operated.

15. The apparatus of claim 13 wherein the winch comprises a motor operable to control retraction of the at least one flexible elongate support.

16. The apparatus of claim 8 wherein the harvesting header carrier is a first harvesting header carrier and is operable to support the harvesting header at a first location of the harvesting header and wherein the apparatus further comprises a second harvesting header carrier operable to support the harvesting header at a second location of the harvesting header spaced apart from the first location.

17. The apparatus of claim 16 wherein the first harvesting header carrier includes a carrier connector operable to removably connect to the second harvesting header carrier.

18. The apparatus of claim 16 wherein the second harvesting header carrier includes a towing connector operable to connect to a vehicle for transporting the harvesting header.

19. The apparatus of claim 16 wherein the second harvesting header carrier includes a variable length support operable to connect to the harvesting header at the second location when the harvesting header is supported above the second harvesting header carrier and operable to shorten in response to the harvesting header being lowered.

20. The apparatus of claim 19 wherein the variable length support comprises a plurality of telescoping members and a lock for locking the telescoping members with respect to one another.

21. The apparatus of claim 8 further comprising harvesting equipment engaged with the harvesting header to hold the harvesting header above the support surface.

22. The apparatus of claim 8 wherein the harvesting header carrier includes:
a frame coupled to the plurality of flexible elongate supports;
a wheel assembly connected to the frame and operable to support the harvesting header carrier during transport; and
a carrier support connected to the frame, said carrier support movable between a supporting position wherein the carrier support is operable to support the harvesting header carrier and a transport position.

23. The apparatus of claim 22 wherein the carrier support is pivotally connected to the frame and pivotable between the supporting position and the transport position.

24. The apparatus of claim 23 wherein the carrier support comprises a carrier support member and wherein when the carrier support member is substantially vertical, the carrier support is in the supporting position.

25. The apparatus of claim 24 wherein when the carrier support member is substantially horizontal, the carrier support is in the transport position.

26. The apparatus of claim 22 wherein the harvesting header carrier is a first harvesting header carrier and is operable to support the harvesting header at a first location of the harvesting header and wherein the apparatus further comprises a second harvesting header carrier operable to support the harvesting header at a second location of the harvesting header and wherein the carrier support includes a carrier support connector operable to connect to the second harvesting header carrier when the carrier support is in the transport position.

27. An apparatus comprising:
a plurality of flexible elongate supports;
respective header connectors and carrier connectors coupled to each of the plurality of flexible elongate supports, said header connectors operable to connect to a harvesting header at spaced apart positions and said carrier connectors operable to connect to a harvesting header carrier to link the harvesting header and the harvesting header carrier; and
a retractor device coupled to the plurality of flexible elongate supports and operable to substantially simultaneously retract each of the plurality of flexible elongate supports when said header connectors and said carrier connectors are connected to the harvesting header and the harvesting header carrier respectively to shorten respective effective lengths of the flexible elongate supports and cause the harvesting header carrier to be lifted off of a support surface towards the harvesting header to engage with the harvesting header.

28. The apparatus of claim 27 further comprising harvesting equipment operable to hold the harvesting header above a support surface.

29. An apparatus for supporting a harvesting header for transportation, the apparatus comprising:
a first harvesting header carrier operable to support the harvesting header at a first location, said first harvesting header carrier including at least one harvesting header connector operable to removably connect to the harvesting header; and
a second harvesting header carrier operable to support the harvesting header at a second location spaced apart from the first location, said second harvesting header carrier including at least one harvesting header connector operable to removably connect to the harvesting header;
wherein the first harvesting header carrier includes a carrier connector operable to removably connect to the second harvesting header carrier when the first and second harvesting header carriers are not connected to the harvesting header; and
wherein the apparatus is configurable between a first operational mode and a second operational mode and wherein:
in the first operational mode, the first and second harvesting header carriers are spaced apart and the harvesting header connectors of the first and second harvesting header carriers are both releasably connected to and support the harvesting header for transport with the harvesting header being un-supported beneath said harvesting header by any other component between the first and second harvesting header carriers; and
in the second operational mode, the harvesting header connectors of the first and second harvesting header carriers are disconnected from the harvesting header and the carrier connector is connected to the second harvesting header carrier such that the first and second harvesting header carriers are directly interconnected and operable to be transported without the harvesting header.

30. The apparatus of claim 29 wherein the second harvesting header carrier includes a towing connector operable to connect to a vehicle for transporting the harvesting header.

31. The apparatus of claim 30 wherein the first harvesting header carrier includes:
   a frame coupled to the at least one harvesting header connector of the first harvesting header carrier;
   a wheel assembly connected to the frame and operable to support the first harvesting header carrier during transport; and
   a carrier support connected to the frame, said carrier support movable between a supporting position wherein the carrier support is operable to support the first harvesting header carrier and a transport position.

32. The apparatus of claim 31 wherein the carrier support is pivotally connected to the frame and pivotable between the supporting position and the transport position.

33. The apparatus of claim 31 wherein the carrier support comprises a carrier support member and wherein when the carrier support member is substantially vertical, the carrier support is in the supporting position.

34. The apparatus of claim 33 wherein when the carrier support member is substantially horizontal, the carrier support is in the transport position.

35. The apparatus of claim 29 further comprising harvesting equipment operable to hold the harvesting header above a support surface.

\* \* \* \* \*

UNITED STATES PATENT AND TRADEMARK OFFICE
CERTIFICATE OF CORRECTION

PATENT NO. : 10,021,823 B2
APPLICATION NO. : 14/143023
DATED : July 17, 2018
INVENTOR(S) : Glenn Honey It is certified that error appears in the above-identified patent and that said Letters Patent is hereby corrected as shown below:

On the Title Page

The Assignee's name should be changed to HONEY BEE MANUFACTURING LTD.

Signed and Sealed this
Tenth Day of December, 2019

Andrei Iancu
*Director of the United States Patent and Trademark Office*